US008442299B2

(12) United States Patent
Longo et al.

(10) Patent No.: US 8,442,299 B2
(45) Date of Patent: May 14, 2013

(54) EVALUATION OF IMAGE PROCESSING ALGORITHMS

(75) Inventors: Peter P. Longo, Hopewell Junction, NY (US); Alfred Wagner, Brewster, NY (US)

(73) Assignee: International Business Machines Corporation, Armonk, NY (US)

( * ) Notice: Subject to any disclaimer, the term of this patent is extended or adjusted under 35 U.S.C. 154(b) by 644 days.

(21) Appl. No.: 12/615,392

(22) Filed: Nov. 10, 2009

(65) Prior Publication Data
US 2011/0110578 A1   May 12, 2011

(51) Int. Cl.
*G06K 9/00* (2006.01)
(52) U.S. Cl.
USPC .......... 382/144; 382/275; 382/278; 382/147; 382/118
(58) Field of Classification Search .............. 382/144, 382/274, 275, 278, 141, 145, 147, 149, 118, 382/209, 218
See application file for complete search history.

(56) References Cited

U.S. PATENT DOCUMENTS

| | | | | |
|---|---|---|---|---|
| 6,282,309 | B1 * | 8/2001 | Emery | 382/145 |
| 7,123,356 | B1 * | 10/2006 | Stokowski et al. | 382/144 |
| 7,558,419 | B1 | 7/2009 | Ye et al. | 382/144 |
| 2006/0194130 | A1 | 8/2006 | Roberts et al. | 430/30 |
| 2009/0034828 | A1 * | 2/2009 | Ferro et al. | 382/144 |
| 2009/0080759 | A1 | 3/2009 | Bhaskar et al. | 382/141 |

OTHER PUBLICATIONS

V. Kayargadde et al., "An Objective Measure for Perceived Noise", Signal Processing 49, 1996, pp. 187-206.
Steven W. Smith, Chapter 27 "The Scientist and Engineer's Guide to Digital Signal Processing", California Technical Publishing 1998, ISBN 0-9660176-3-3.
A. Wong et al, "Rigorous Three-Dimensional Time-Domain Finite-Difference Electromagnetic Simulation for Photolithographic Applications", IEEE Transactions on Semiconductor Manufacturing, vol. 8, No. 4, Nov. 1995.
A. Wong et al., "Massively Parallel Electromagnetic Simulation for Photolitohographic Applications", IEEE Transactions on Comupter-Aided Design of Integrated Circuits and Systems, vol. 14, No. 10, Oct. 1995.
Y. Sun et al., "Autofocusing Algorithm Selection in Computer Microscopy", IEEE/RSJ International Conference on Intelligent Robots and Systems, (IROS2004), Edmonton, Alberta, Canada, Aug. 2-6, 2005.
J. Geusebroek et al., "Robust Autofocusing in Microscopy", 2000, Cytometry 39:1-9.
K. Toh et al., "Three-Dimensional Simulation of Optical Lithography", SPIE vol. 1463, Optical/Laser Microlithography IV (1991).
A. Santos et al., "Evaluation of Autofocus Functions in Molecular Cytogenetic Analysis", Journal of Microscopy, vol. 188, pt. 3, Dec. 1997, pp. 264-272.

(Continued)

*Primary Examiner* — Gregory J Toatley
*Assistant Examiner* — Iyabo S Alli
(74) *Attorney, Agent, or Firm* — Harrington & Smith

(57) ABSTRACT

One exemplary aspect of this invention pertains to a method to evaluate an image processing algorithm. The method includes varying a parameter of a model of an imaging system and, for each variation of the parameter, calculating with a data processor a corresponding image of a sample; applying an image processing algorithm to the calculated corresponding images of the sample; and determining an ability of the image processing algorithm to detect the variation in the parameter.

20 Claims, 13 Drawing Sheets

OTHER PUBLICATIONS

F. Groen et al., "A Comparison of Different Focus Functions for Use in Autofocus Algorithms", Cytometry 6:8191, 1985.

C. Mach, "Prolith: A Comprehensive Optical Lithography Model", SPIE vol. 538, Optical Microlithography IV 1985.

Y. Sun et al. "Autofocusing in Computer Microscopy: Selecting the Optimal Focus Algorithm", Microscopy Research and Technique 65:139-149 (2004).

X. Liu, "Dynamic Evaluation of Autofocusing for Automated Microscopic Analysis of Blood Smear and Pap Smear", Journal of Microscopy, vol. 227, Pt 1 2007, pp. 15-23.

R. Gordon et al., "Lithographic Image Simulation for the $21^{st}$ Century with $19^{th}$-Century Tools", Wave-Optical Systems Engineering II, edited by F. Wyroski, Proceedings of SPIE vol. 5182, 2003.

Z. Shu et al., "A Super Fast 3-D Lithography Simulator and Its Application for ULSI Printability Analysis", Optical Microlithography XVII, Proceedings of SPIE vol. 5377, 2004.

* cited by examiner

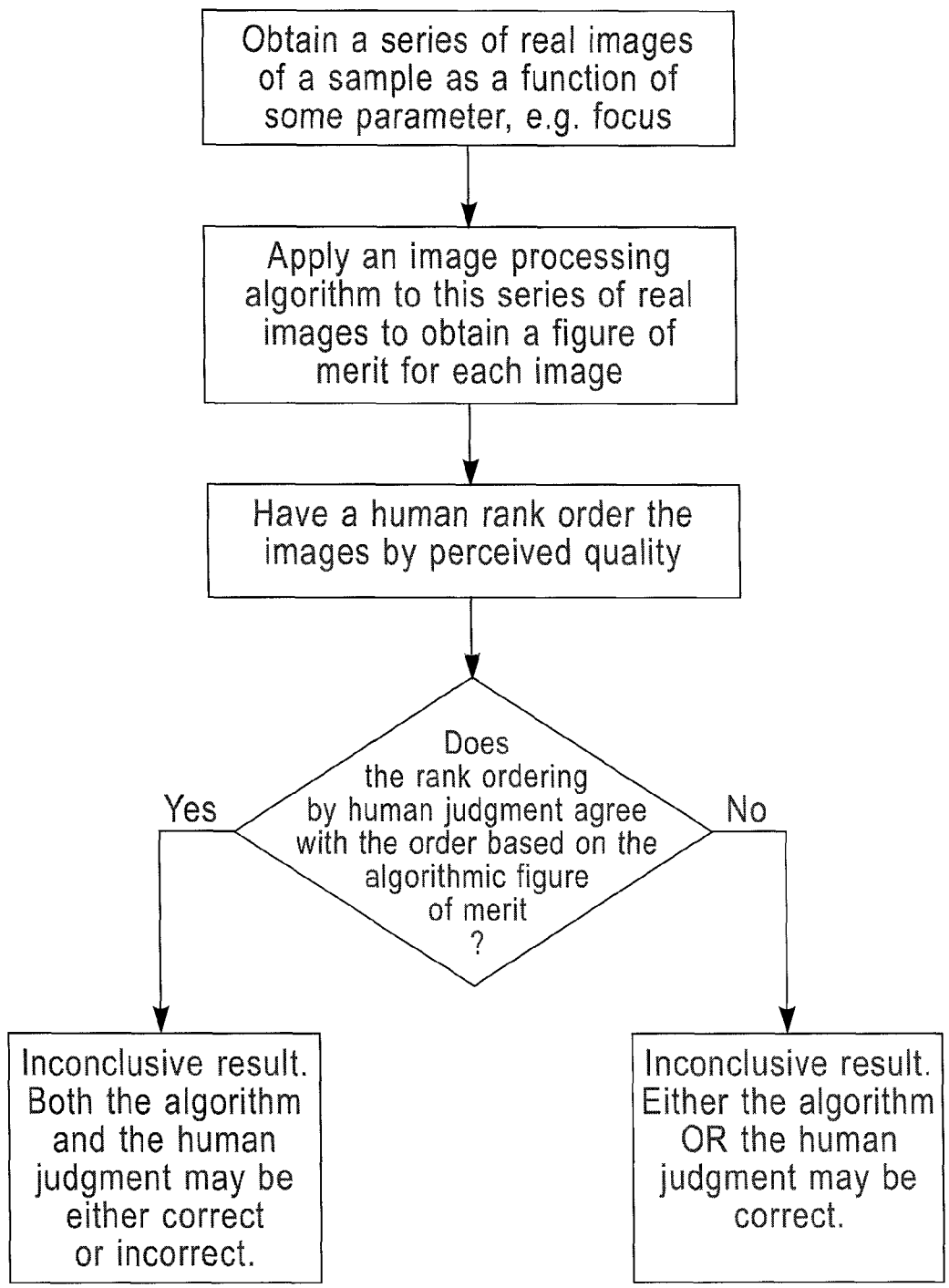
FIG. 1A
Conventional

EVALUATION OF IMAGE PROCESSING ALGORITHMS

TECHNICAL FIELD

The exemplary embodiments of this invention relate generally to a method of systematically and objectively evaluating and improving the effectiveness of image processing algorithms, thereby removing uncertainty and variability introduced by human judgment.

BACKGROUND

An image processing algorithm typically calculates a figure of merit for a series of real images, and the image having the largest figure of merit is assumed to be the "best" image. Reference in this regard may be made to, for example, F. C. A. Groen, I. T. Young, G. Lighthart, "A comparison of different focus functions for use in autofocus algorithms", Cytometry, Vol. 6, pgs. 81-91 (1985). The quality and effectiveness of the algorithm is typically tested by comparing the image selected using the algorithm with an image that a human selects as the "best" image. Reference in this regard may be made to, for example, any of the following publications (in addition to the Groen et al. publication noted above): A. Santos, et. al., "Evaluation of autofocus functions in molecular cytogenic analysis", J. Microscopy, Vol 188 (3), pp 264-72, (1997); J. M. Geusebroek, F. Cornelissen, A. Smeulders, H. Geerts, "Robust Autofocusing in Microscopy", Cytometry, Vol. 39, pgs. 1-9 (2000); Y. Sun, S. Duthaler, and B. J. Nelson, "Autofocusing in computer microscopy—selecting the optimal focus algorithm," Microscopy Research and Technique, Vol. 65, No. 3, pgs. 139-149, 2004; Y. Sun, S. Duthaler, and B. J. Nelson, "Autofocusing algorithm selection in computer microscopy," IEEE/RSJ International Conference on Intelligent Robots and Systems (IROS2005), Edmonton, Alberta, Canada, Aug. 2-6, 2005; and X. Y. Liu, W. H. Wang, Y. Sun, "Dynamic evaluation of autofocusing for automated microscopic analysis of blood smear and pap smear", J. Microscopy Vol. 227(1), pgs. 15-23 (2007).

In a conventional approach, shown in FIG. 1A, a first step applies an image processing algorithm to a series of real images to obtain a figure of merit for each image. A next step then uses a human to rank order the images by perceived quality. A determination is then made to determine if the rank ordering by human judgment agrees with the order based on the algorithmic figure of merit. If it does, the result is inconclusive since both the algorithm and the human judgment may be either correct or incorrect. If the rank ordering based on human judgement is found not to agree with the algorithmic figure of merit the result is also inconclusive, since either the algorithm or the human judgment may be correct.

As may be appreciated, this conventional approach is subjective and error prone. In addition to the variability of human judgment, for some imaging situations neither the algorithm nor the human actually select the "best" image. Thus, conventional methods of evaluating image processing algorithms, as outlined in FIG. 1A, are inadequate and error prone.

SUMMARY

The foregoing and other problems are overcome, and other advantages are realized, in accordance with the exemplary embodiments of this invention.

In one exemplary aspect thereof embodiments of this invention provide a method to evaluate an image processing algorithm. The method includes varying a parameter of a model of an imaging system and, for each variation of the parameter, calculating with a data processor a corresponding image of a sample; applying an image processing algorithm to the calculated corresponding images of the sample; and determining an ability of the image processing algorithm to detect the variation in the parameter.

In another exemplary aspect thereof embodiments of this invention provide a method to evaluate image compression and decompression algorithms. The method comprises, using a data processor, injecting varying degrees of noise to a calculated image of a sample, producing a first set of calculated images having varying degrees of image degradation; applying at least one noise detecting algorithm to the first set of calculated images to evaluate the effectiveness of the at least one noise detecting algorithm to detect image degradation in the first set of calculated images; applying at least two different compression/decompression algorithms to the first set of calculated images to generate at least second and third sets of calculated images; applying the at least one noise detecting algorithm to the generated at least second and third sets of calculated images; and determining which one of the at least two image compression/decompression algorithms introduces the least additional image degradation.

In another exemplary aspect thereof embodiments of this invention provide a computer-readable storage medium containing computer software instructions, where the execution of the computer software instructions by a data processor results in operations that comprise varying a parameter of a model of an imaging system and, for each variation of the parameter, calculating a corresponding image of a sample; applying an image processing algorithm to the calculated corresponding images of the sample; and determining an ability of the image processing algorithm to detect the variation in the parameter.

In another exemplary aspect thereof embodiments of this invention provide a computer-readable storage medium containing computer software instructions, where the execution of the computer software instructions by a data processor results in operations that comprise injecting varying degrees of noise to a calculated image of a sample, producing a first set of calculated images having varying degrees of image degradation; applying at least one noise detecting algorithm to the first set of calculated images to evaluate the effectiveness of the at least one noise detecting algorithm to detect image degradation in the first set of calculated images; applying at least two different compression/decompression algorithms to the first set of calculated images to generate at least second and third sets of calculated images; applying the at least one noise detecting algorithm to the generated at least second and third sets of calculated images; and determining which one of the at least two image compression/decompression algorithms introduces the least additional image degradation.

BRIEF DESCRIPTION OF THE DRAWINGS

The foregoing and other aspects of the embodiments of this invention are made more evident in the following Detailed Description, when read in conjunction with the attached Drawing Figures, wherein:

FIG. 1A is a logic flow diagram showing a conventional practice for evaluating an image processing algorithm, such as a focusing algorithm.

FIG. 3A shows variance versus focus for calculated images of various features on a chrome-on-glass photomask, while

FIG. 4A shows pattern and intensity contours, and FIG. 4B shows the simulated image.

FIG. 5A shows a −280 nm defocus condition, FIG. 5B shows an in-focus condition, and FIG. 5C shows a +280 nm defocus condition.

FIG. 7A shows pattern and intensity contours, and FIG. 7B shows the simulated image.

FIG. 8A shows a −200 nm defocus condition, FIG. 8B shows an in-focus condition, and FIG. 8C shows a +200 nm defocus condition.

DETAILED DESCRIPTION

Image processing algorithms are routinely used to evaluate the quality of an image or a series of images. Algorithms may be used to evaluate, as non-limiting examples, the focus, illumination uniformity, spatial distortion, and/or noise of an image, or to detect defects or variations in spatial extent, in an image relative to a standard. The algorithm provides a figure of merit intended to select the "best" image from the series of images, or provide a quantitative measure of variation in the series of images. Typically, the performance of the algorithm may be tested using real images of a sample. Since real images in most, if not all cases contain variations in numerous parameters, and uncertainty in the value(s) of the parameter of interest, testing of the algorithm is compromised.

As was noted above, algorithms are often evaluated by comparing the "best" image selected by the algorithm with the image a human would select. Unfortunately, human selection is unreliable, and often does not result in selection of the best image. Algorithms may also be evaluated by comparing the results of one algorithm with the results of another algorithm. However, since no "absolute" standard currently exists, only relative comparisons are possible with this approach.

It is assumed that the imaging behavior of any optical system, which may be referred to without a loss of generality as an imaging system, may be accurately calculated and modeled and used to replicate the actual imaging behavior of the optical system (see, for example, R. L. Gordon, A. E. Rosenbluth, "Lithographic image simulation for the 21st century with 19th century tools", SPIE, Vol. 5182, pgs. 73-87 (2004)). In accordance with the exemplary embodiments of this invention an optical system of interest is modeled, and the model is used to generate calculated images of a sample. A particular parameter of the optical system of interest, such as focus, is systematically varied in the model to obtain a series of calculated images at known absolute values of the particular parameter. An image processing algorithm is applied to the series of calculated images to determine how well the algorithm differentiates the images based on the varied parameter, and how successfully the algorithm selects the "best" image, e.g., the best focused image. By the use of this technique the performance of the image processing algorithm can be accurately assessed, as the subjectivity and variability introduced by the use of a human observer is avoided.

Figure 1B:
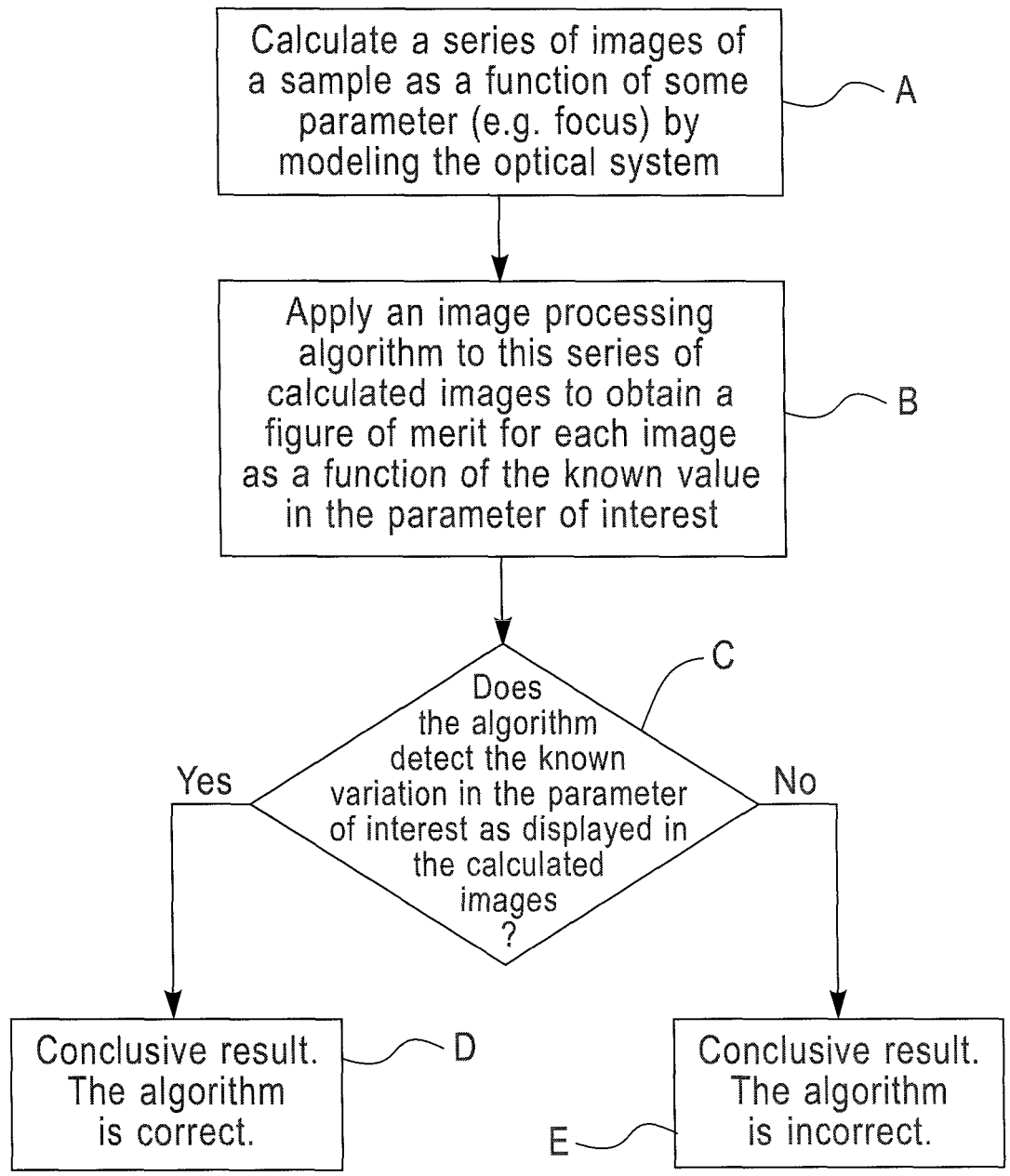
FIG. 1B is a logic flow diagram showing, in accordance with the exemplary embodiments of this invention, the evaluation of an image processing algorithm using calculated images.

A method in accordance with the exemplary embodiments of this invention is outlined in FIG. 1B. The method eliminates uncertainty in image selection by using calculated images in which the "best" image is known a priori. While described below primarily in the context of a method used for the specific case of an algorithm to select a best focused image, the method is more general and may be applied to image processing algorithms other than focus algorithms.

By using calculated images rather than real images of a sample, all unwanted variations in the image are eliminated. In addition, by using calculated images, the absolute value of the parameter of interest (such as focus, distortion, noise, linewidth, edge roughness or edge slope) is known. Thus, accurate evaluation of an image processing algorithm becomes possible.

FIG. 1B shows an example of a method in accordance with the invention. In FIG. 1B, at Step A, a series of images of a sample are calculated as a function of some parameter (e.g., focus) by modeling the optical system. At Step B an image processing algorithm is applied to the series of calculated images to obtain a figure of merit for each image as a function of the known value in the parameter of interest. At Step C a determination is made as to whether the image processing algorithm detects the known variation in the parameter of interest as displayed in the calculated images. If the result is affirmative, at Step D a conclusive result is declared and the image processing algorithm is assumed to be correct. If the result is negative at Step C a conclusive result is also declared, and the image processing algorithm is assumed to be incorrect.

Related to FIG. 1B, an appropriate model of the optical system is created. Numerous methods of modeling the performance of an optical system are routinely used, particularly in the field of semiconductor lithography. These methods range from simple optical ray tracing (see, for example, in addition to the above-cited R. L. Gordon, A. E. Rosenbluth, "Lithographic image simulation for the 21st century with 19th century tools", SPIE, Vol. 5182, pgs. 73-87 (2004), also C. Mack, PROLITH: A comprehensive optical lithography model. SPIE Optical Microlithography IV, Vol. 538, pgs. 207-220 (1985)), to a full three dimensional solution of Maxwell's equations (see, for example, Z. Zhu, A. Strojwas, "A superfast 3D lithography simulator and its application for ULSI printability analysis", SPIE Vol. 5377, pgs. 658-669 (2004); K. Toh and A. Neureuther. "Three-dimensional simulation of optical lithography", In Proceedings: SPIE Vol. 1463, pgs. 356-367 (1991); A. Wong and A. R. Neureuther, "Rigorous three-dimensional time-domain finite-difference electromagnetic simulation," IEEE Trans. Semiconductor Manufacturing, Vol. 8, No. 4, pgs. 419-431, November 1995; and A. Wong, R. Guerrieri, and A. R. Neureuther, "Massively parallel electromagnetic simulation for photolithographic applications," IEEE Transactions on CAD, Vol. 14, No. 10, pgs. 1231-1240, October 1995)). In all cases, the models produce an accurate calculated image of a sample. A parameter of the optical system (e.g., focus), or of the sample (e.g., phase) is systematically varied, and a series of images are calculated. The image processing algorithm is then applied to this series of calculated images. By correlating the results of the image processing algorithm with the known variation in the parameter of interest, the ability of the algorithm to detect the variation in this parameter can be determined unambiguously. Thus, the image processing algorithm can be tested to determine how well the algorithm differentiates the images based on the varied parameter, and how successfully the algorithm selects the "best" image, e.g. the best focused image. A specific and non-limiting example is now described.

Focusing algorithms are often utilized to automatically adjust the focus of an optical microscope to obtain the "sharpest" (i.e., best focused) image. One widely used focus algorithm calculates the variance of an image taken at one focus setting, and compares it to the variance of an image taken at another focus setting. The image with the larger variance is selected as the best focused image, since a well focused image should have more contrast and hence variance than a poorly focused image. Previously the accuracy of this algorithm could be tested by comparison with the best focused images selected by a human (see, for example, X.Y. Liu, W. H. Wang, Y. Sun, "Dynamic evaluation of autofocusing for automated microscopic analysis of blood smear and pap smear", J. Microscopy Vol. 227(1), pgs. 15-23 (2007)). Implicit in this approach is the assumption that the algorithm and/or human will consistently select the best focused image. However, the inventors have discovered that this assumption is not valid.

In the course of developing an autofocusing system for a photomask repair tool it was found that operators were unable to reliably produce focused images of a particular class of photomasks. While the operators were generally able to reliably focus a chrome-on-glass photomask, they were unable to consistently focus attenuated phase shift photomasks. The operators were simply uncertain as to what constituted a well focused image of a phase shift mask due to the complex variation in image contrast as the focus was varied. Thus, human judgment was unreliable in this case.

Figure 2:
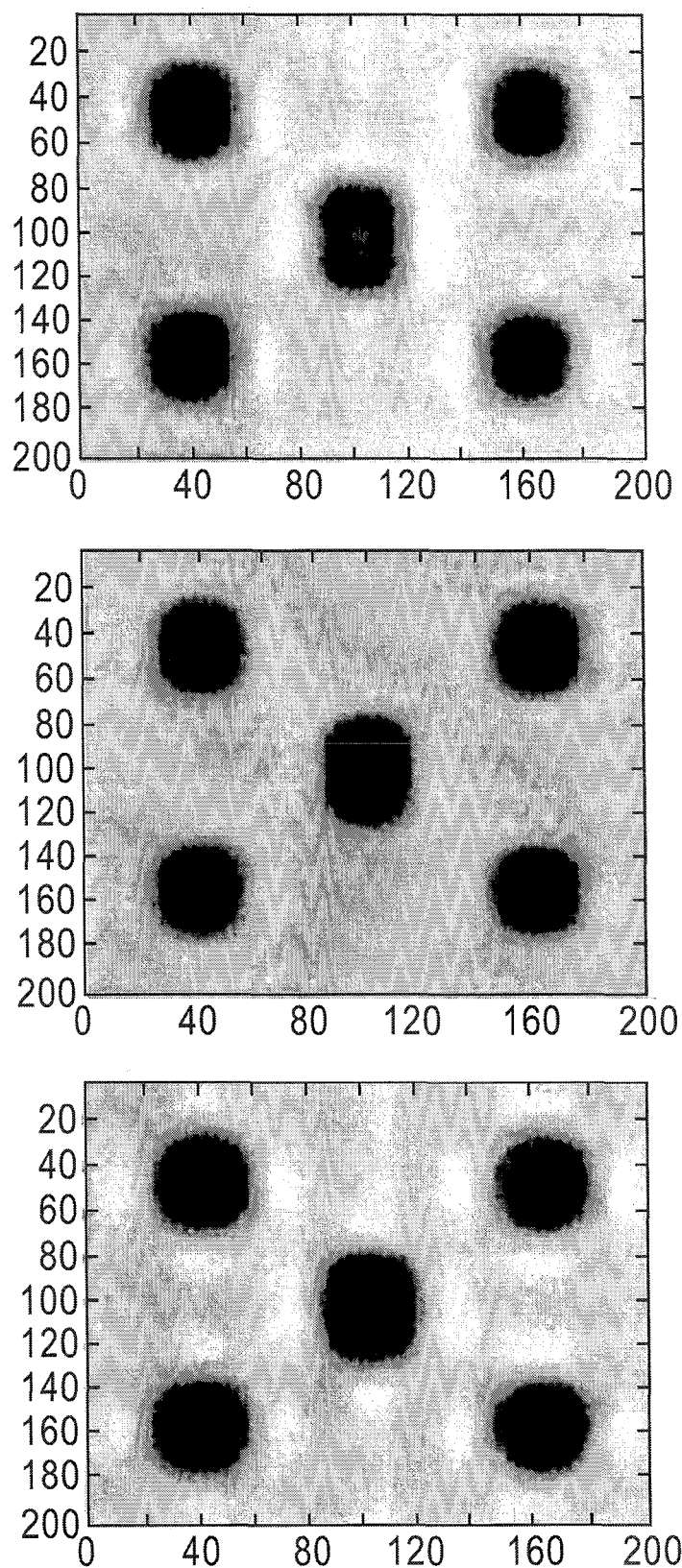
FIG. 2 shows exemplary calculated images of a photomask at three focus values.

In accordance with an aspect of this invention the optical system of the repair tool was modeled and images were calculated of both chrome-on-glass and phase shift photomasks as a function of defocus. The images shown in FIG. 2 were calculated for a transmitted light optical system having a 0.9 numerical aperture objective lens, operating at 248 nm wavelength, with an illumination coherence of 0.6 sigma. The chrome-on-glass photomask had regions of 0% and 100% transmission of the 248 nm light, while the attenuated phase shift photomask had regions of 28% transmission with a phase shift of 168 degrees with respect to regions of 100% transmission, corresponding to measured values for both types of photomasks. Images of various line/space and contact hole patterns were calculated at varying amounts of defocus. The variance algorithm was then applied to the calculated images, with the results plotted in FIG. 3. Each data point in FIG. 3 corresponds to the variance of a calculated image at a particular defocus, with 0 corresponding to perfect focus.

Figure 3A:
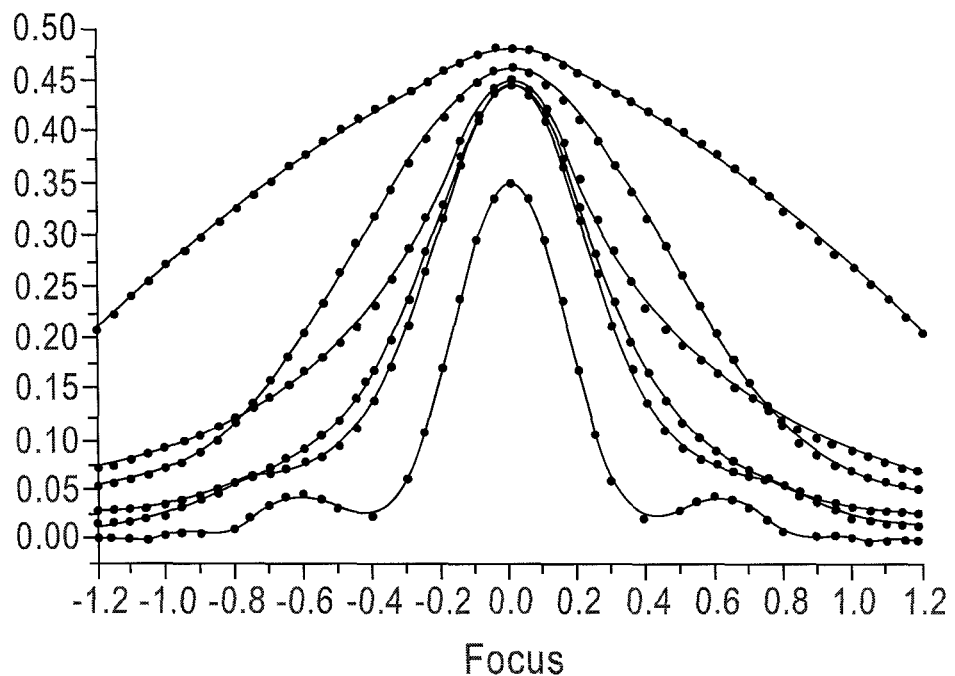
Figure 3B:
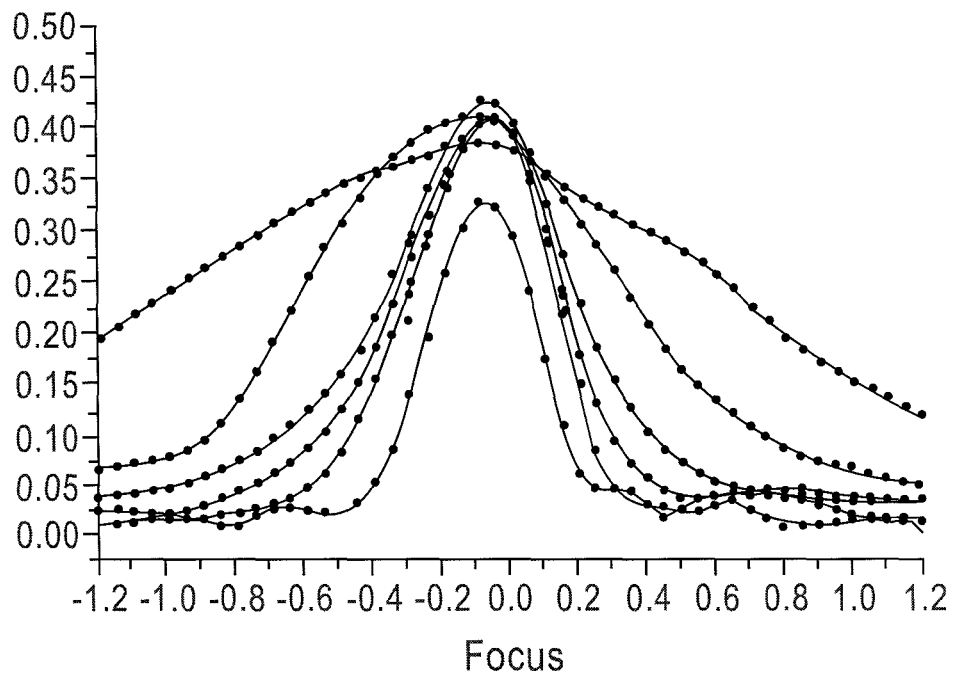
FIG. 3B shows variance versus focus for calculated images of various features on an attenuated phase shift mask.

Each of the seven curves in FIGS. 3A and 3B correspond to a different 2-dimensional pattern on the photomask, with FIG. 3A representing results for the chrome-on-glass photomask, and FIG. 3B representing results for the attenuated phase shift photomask. The results show that the variance algorithm consistently selected the chrome-on-glass images with zero defocus (i.e., the maximum variance always occurred for the best focused images as shown in FIG. 3A), but the algorithm consistently selected defocused images of the attenuated phase shift photomasks (i.e., the maximum variance occurred for defocused images as shown in FIG. 3B). The seven curves shown in FIG. 3, representing the different photomask patterns employed, show that the sensitivity of the algorithm to defocus, as indicated by the width of the curves, is highly dependent on the specific pattern. The use of the calculated images enabled the accurate evaluation of the accuracy and precision of the focus algorithm, and furthermore determination to be made as to what constitutes a "best focused" image of both chrome-on-glass and attenuated phase shift photomasks. The use of the calculated images furthermore provides a method to more accurately select the best focused image of an attenuated phase shift photomask by adding a predetermined offset to the focus selected by the variance algorithm, the offset that is used being based on the results shown in FIG. 3B.

The method depicted in FIG. 1B may be applied to a wide array of use cases and applications, and is particularly useful in the field of semiconductor lithography. For example, detecting defects on a photomask involves complex image processing algorithms. Typically, a photomask is fabricated, imaged in an optical inspection system, and the image is compared with the design data used to fabricate the photomask. Any differences between the image and the design data is attributed to defects. The ability of the inspection tool and algorithm to detect defects is usually evaluated by building a test photomask with programmed defects, and experimentally determining which defects the inspection tool can detect. Using the methods described herein, the optical system in the inspection tool is modeled to produce calculated images of a photomask design. The inspection algorithms are then applied to the calculated images to determine the ability of the algorithm to detect a defect. Since any type and magnitude of variation in the photomask can be modeled, the ability of the inspection tool to detect any potential defect can be determined with any degree of precision required. This includes two dimensional and three dimensional spatial errors in the photomask, as well as variations in transmission, phase, scattered light (as non-limiting examples). In additional, potential variations in the inspection tool may also be modeled to determine their impact on defect detection, e.g. noise, aberrations and defocus. Thus, a comprehensive evaluation of the inspection tool is made possible, and is not subject to the uncertainties and variations inherent in a fabricated test photomask. Since computations may be performed quickly and inexpensively, a large number of possible defects may be tested for detectability by the inspection tool. Similarly, by modeling the optical lithography printing tool, the significance of defects detected or missed by the inspection tool may also be determined.

The foregoing method may be applied in other lithography situations. For example, various linewidth, contact area, or line edge roughness measurement algorithms maybe applied to calculated images of a photomask or semiconductor wafer pattern. Controlled amounts of linewidth variation, roughness, image noise and image rotation, as non-limiting examples, can be included in the calculated images, and the impact on the measurement algorithm evaluated. This procedure may thus significantly aid in the selection and improvement of measurement algorithms.

The foregoing method may be applied to any image processing algorithm and to any type of image. For example, landscape or portrait images can be calculated. Optical systems ranging from, for example, the human eye, to cameras, microscopes, telescopes and binoculars may be modeled.

Imaging systems may include optical light, as well as electron beams or ion beams, as examples. Imaging systems may use electromagnetic radiation to form an image of a sample, where the electromagnetic radiation may be visible light, ultraviolet light, infrared light, x-rays, or microwaves, as non-limiting examples. Blur, lighting, distortion and noise may be varied in each calculated image, and the appropriate image processing algorithm applied to determine how effective the algorithm is at evaluating the varied parameter (e.g., blur, lighting, noise).

Figure 12:
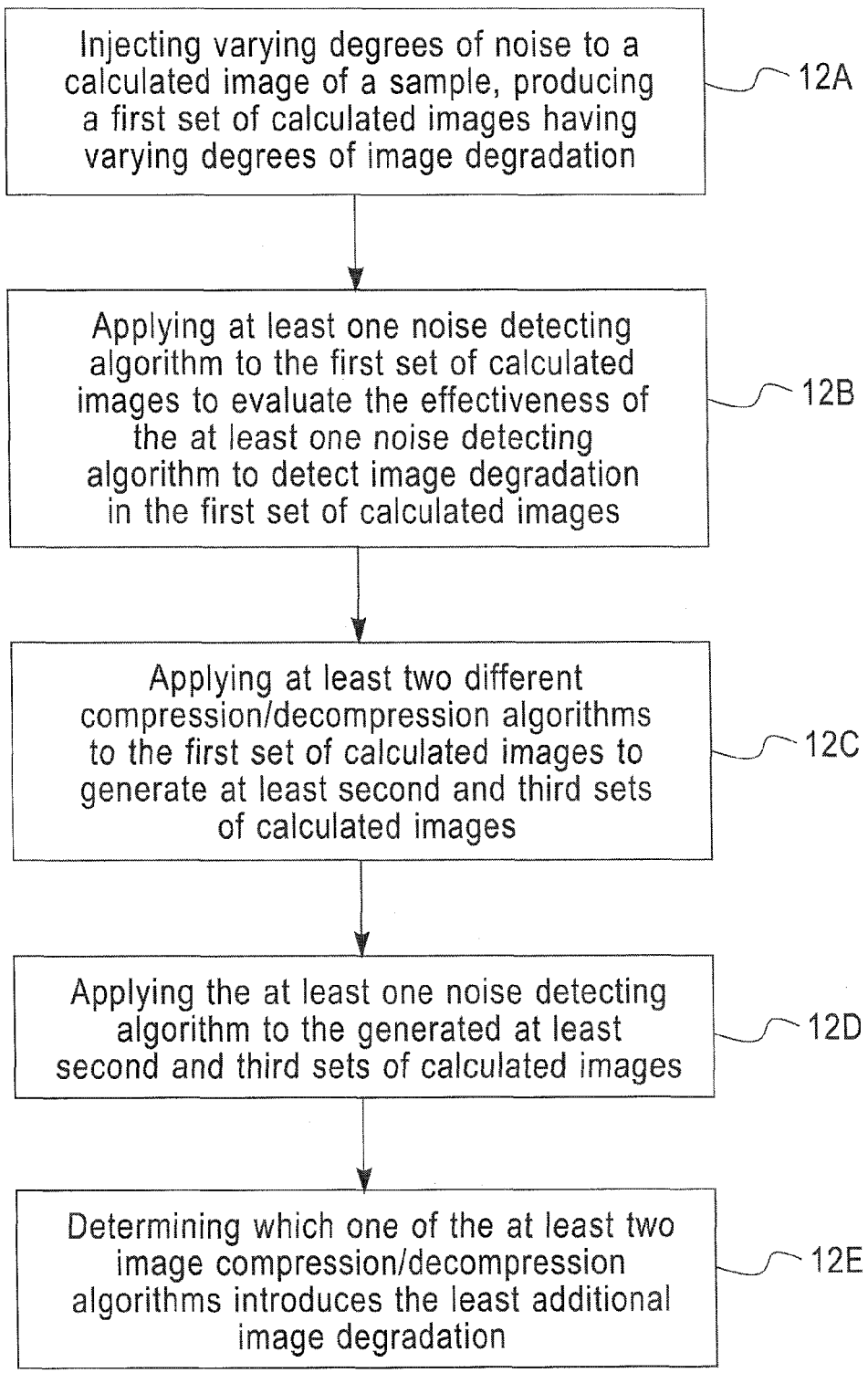
FIG. 12 is a logic flow diagram that is descriptive of a method, as well as operations performed by a computer program product, further in accordance with the exemplary embodiments of this invention.

The exemplary embodiments of this invention may also be used to evaluate image compression algorithms, and determine how well they preserve various image qualities such as blur, lighting, distortion and/or noise, after the compression/decompression process. Reference may also be made to FIG. 12, described in detail below. For example, a single image may be calculated and transformed by injecting varying degrees of controlled noise, thus producing a set of images (Set A). Various noise detecting algorithms can be applied to this set of images (Set A) to evaluate the effectiveness of the algorithms at detecting noise. The Set A of images may then be compressed and decompressed using a compression algorithm, thus forming Set B images. Similarly different compression/decompression algorithms can be applied to Set A images to generate Set C, Set D, etc., images. The noise detecting algorithms can then be applied to the Set B,C, D . . . images. The best compression algorithm (i.e., the one that introduces the least additional noise) can then be determined. This same approach can be used to evaluate the effect of various compression algorithms on other parameters such as distortion and blur, as two non-limiting examples.

By example, algorithms to measure noise in an image are described in "An objective measure for perceived noise" by Vishwakumara Kayargadde and Jean-Bernard Martens, Signal Processing 49 (1996), pgs 187-206, and references therein.

Numerous algorithms for compressing and decompressing images (e.g., jpeg) are also widely used and described in Chapter 27, "The Scientist and Engineer's Guide to Digital Signal Processing" by Steven W. Smith, California Technical Publishing 1997, ISBN 0-9660176-3-3 and in "Digital Image Compression: Algorithms and Standards" by Weidong Kou, Springer 1995, ISBN 978-0792396260.

The exemplary embodiments of this invention thus provide for the use of simulated (calculated) images rather than real (actual) images, and provide precise control of focus variation under known imaging conditions and control of absolute value of focus so as to determine which image is in best focus.

Figure 4A:
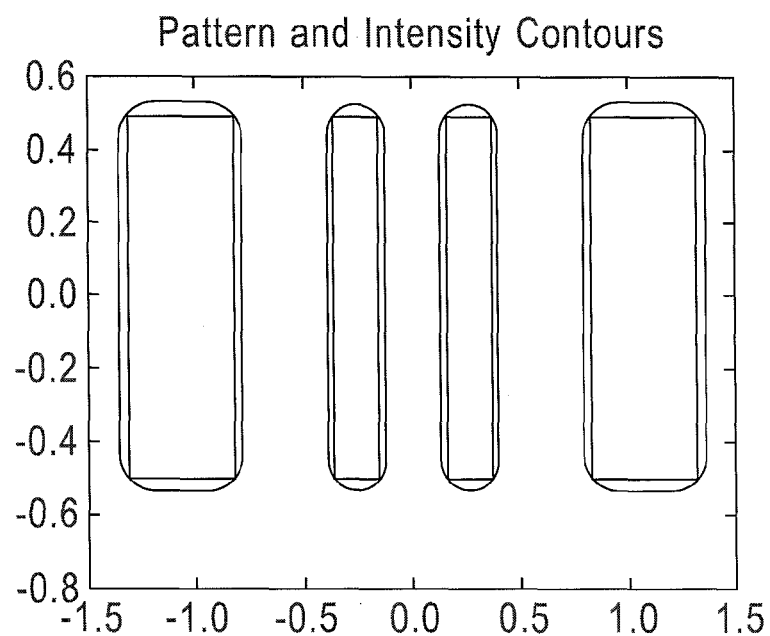
FIGS. 4A and 4B, collectively referred to as FIG. 4, depict simulated image of lines and spaces, where
Figure 4B:
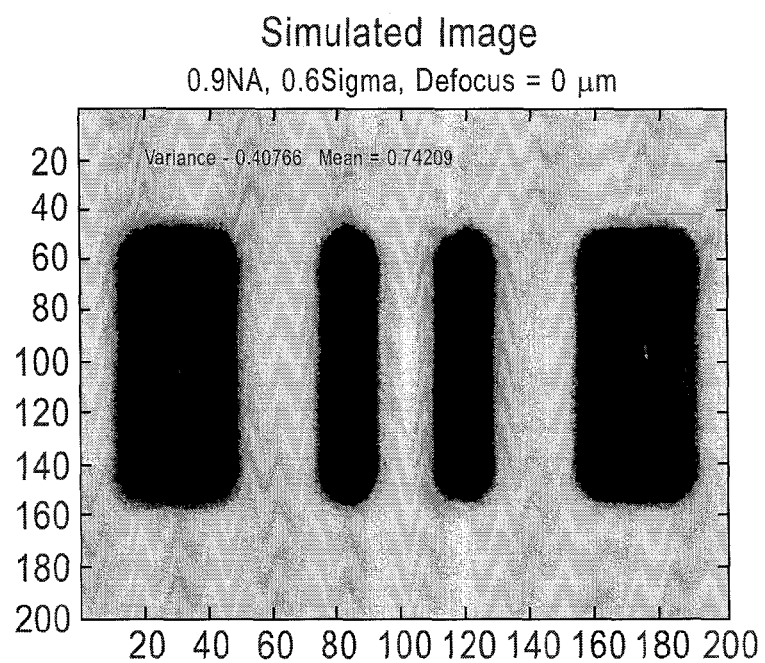
Figure 5A:
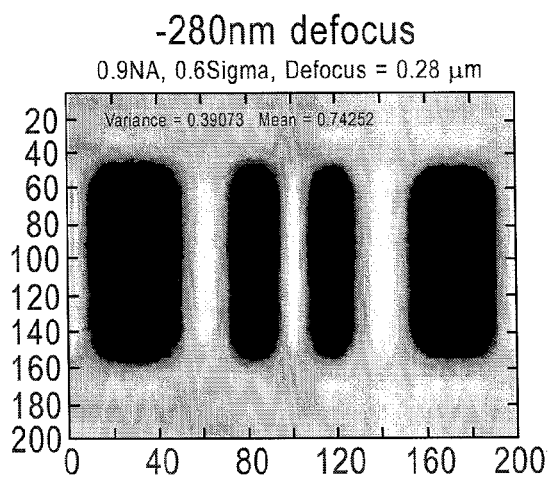
FIGS. 5A-5C, collectively referred to as FIG. 5, show simulated images of lines and spaces of FIG. 4 for a case of a chrome-on-glass mask, where
Figure 5B:
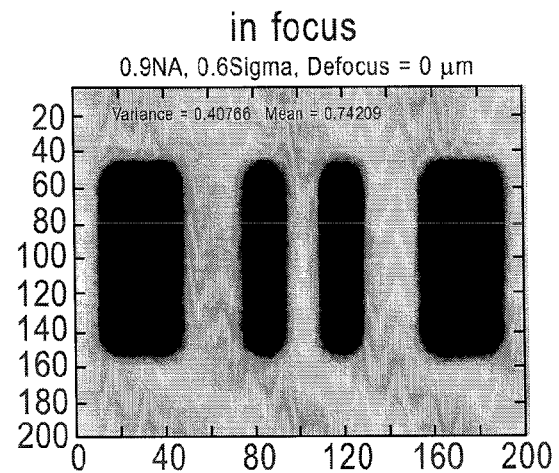
Figure 5C:
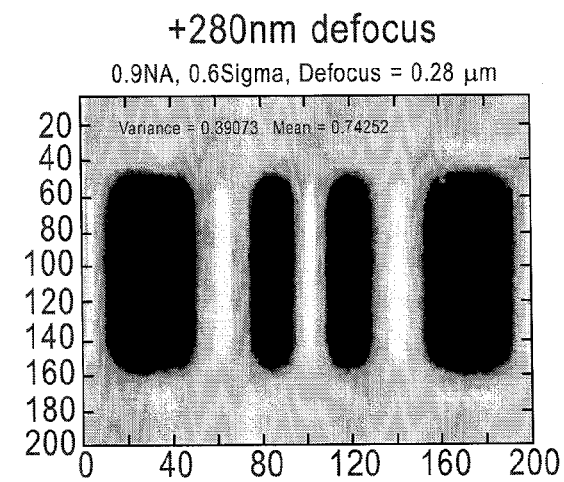
Figure 6:
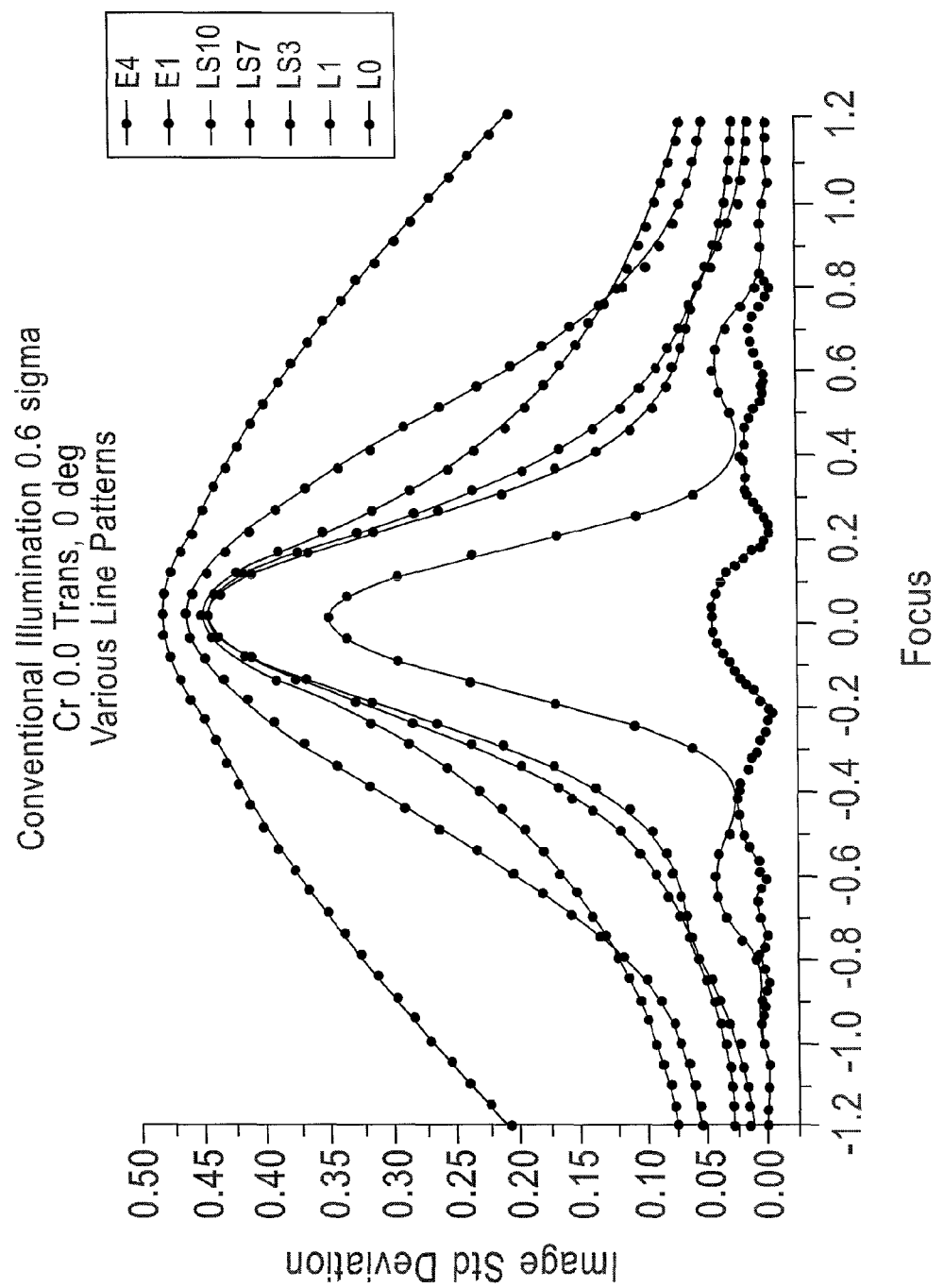
FIG. 6 shows graph of image standard deviation vs. focus for the chrome-on-glass mask for various line types.
Figure 7A:
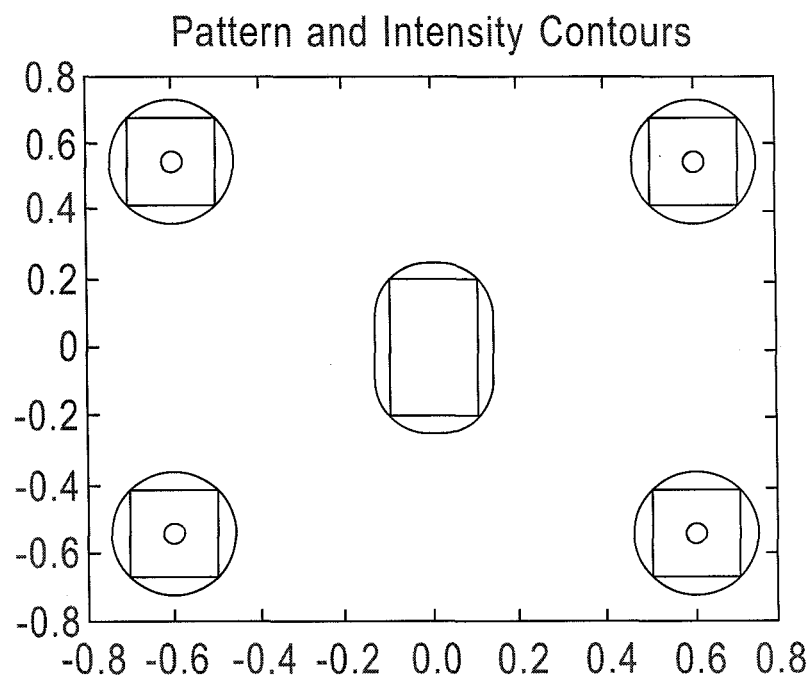
FIGS. 7A and 7B, collectively referred to as FIG. 7, depict simulated image of contact holes, where
Figure 7B:
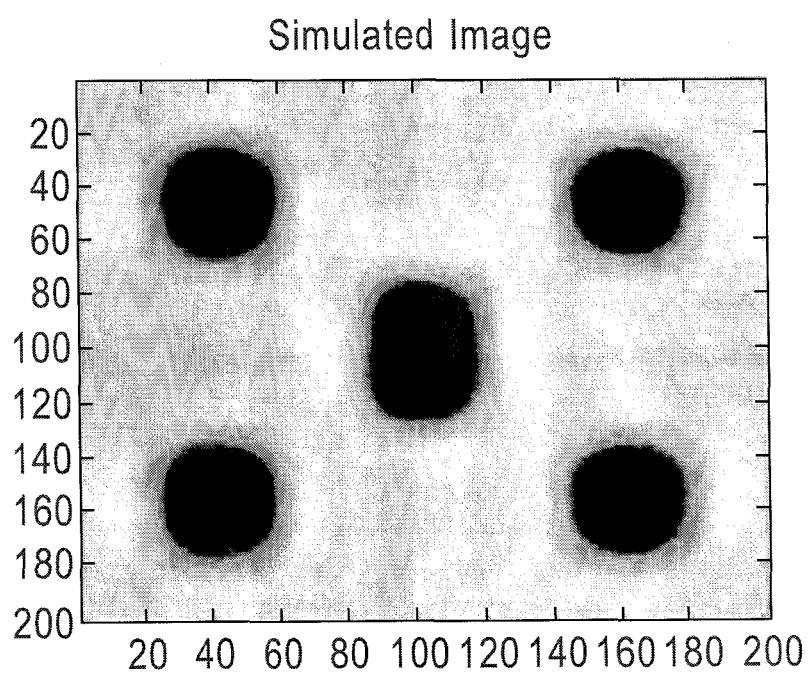
Figure 8A:
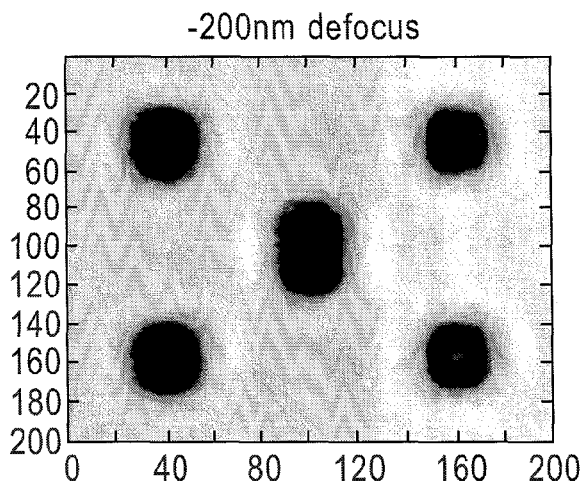
FIGS. 8A-8C, collectively referred to as FIG. 8, show simulated images of contact holes of FIG. 7 for a case of a phase shift mask, where
Figure 8B:
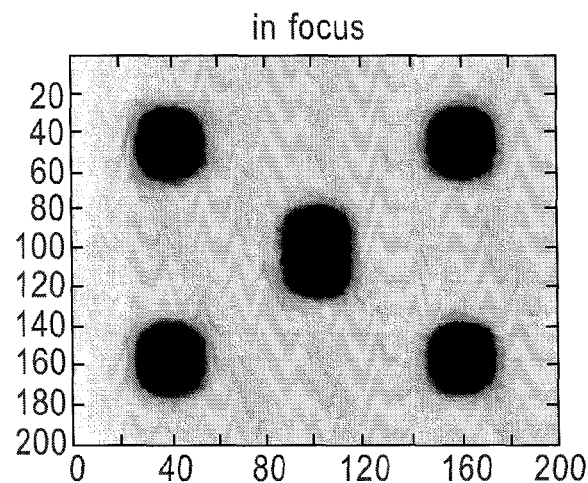
Figure 8C:
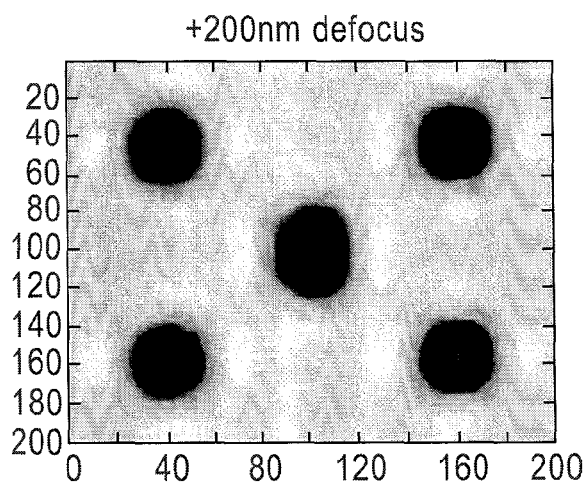
Figure 9:
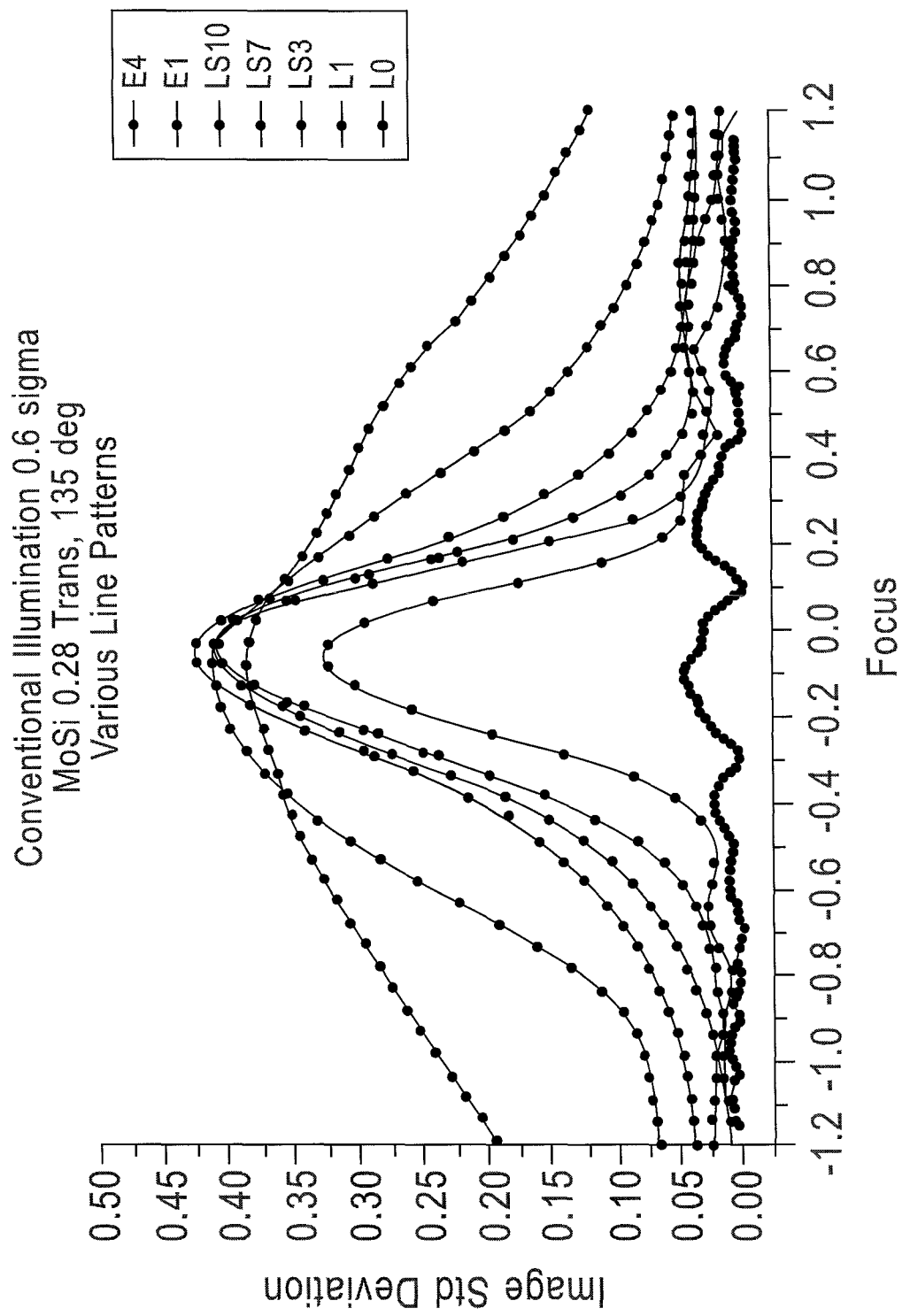
FIG. 9 shows graph of image standard deviation vs. focus for the phase shift mask for various line types, and illustrates a condition wherein the maximum in the standard deviation vs. focus does not occur at 0 de-focus.

As but one non-limiting example, images of typical lithographic patterns are simulated (see, for example, FIG. 4), and a particular set of optical conditions are selected. These optical conditions may include, for example, wavelength, numerical aperture, illumination, focus, aberrations and type of sample (e.g., chrome-on-glass photomask, phase shift photomask). A typical set of patterns, such as lines and spaces, iso lines and spaces and/or contact holes, is selected, and the method then generates a series of images at various amounts of defocus. FIG. 5 shows an exemplary case of—280 nm defocus, in focus, and +280 nm defocus for the simulated image of FIG. 4 for a chrome-on-glass mask. A selected image processing algorithm is then applied to the series of simulated images and a standard deviation of the images is calculated. A determination is then made as to whether a best focus is obtained at the maximum standard deviation. FIG. 6 shows an exemplary case of various line patterns (e.g., E4, E1, etc.) for a chrome-on-glass mask where the maximum in the standard deviation occurs at 0 defocus, and the curves are symmetrical about the 0 defocus point. Further by example, FIG. 7 shows exemplary pattern and image contours, and a simulated image of contact holes. FIG. 8 shows an exemplary case of −280 nm defocus, in focus, and +280 nm defocus for the simulated image of FIG. 7 for a phase shift mask (a MoSi phase shift mask). FIG. 9 shows an exemplary case of the various line patterns for the MoSi phase shift mask, where it can be noted the maximum in the standard deviation does not occur at 0 defocus, and the curves are asymmetrical about the 0 defocus point. This indicates a "failure" of the image processing (focus) algorithm.

In the FIGS. 4-9 images of chrome-on-glass and phase shift masks were simulated, and various line space and contact patterns were simulated. The focus was varied for each image type, and a focus algorithm was applied to each simulated image. The focus algorithm calculated the variance of the image, where the best-focused image should correspond to the image having the largest variance.

The focus algorithm correctly selected the best focused image for the chrome-on-glass mask, but did not select best focused image for the phase shift mask. In fact, the focus algorithm selected an image that was approximately 100 nm defocused. However, the focus algorithm may still be used by offsetting the selected focus for the phase shift mask by a predetermined amount (e.g., 100 nm in this non-limiting example).

Figure 10:
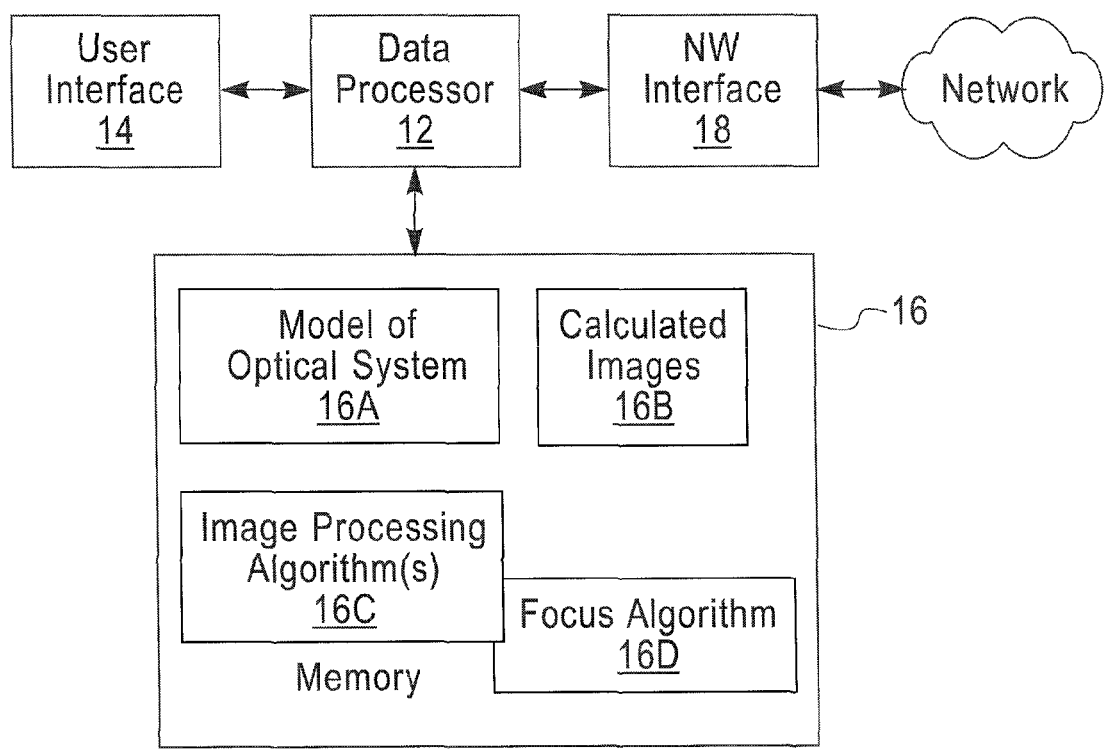
FIG. 10 is a block diagram of an embodiment of a data processing system that is suitable for implementing the exemplary embodiments of this invention.

FIG. 10 is a block diagram of an exemplary embodiment of a data processing system 10 that is suitable for implementing the exemplary embodiments of this invention. System 10 includes at least one data processor 12, a user interface 14, such as a graphical user interface (GUI) and a computer-readable storage medium, such as a memory 16, that stores a plurality of computer software program modules and data structures 16A-16D. The system 10 may also include a network (NW) interface 18 providing bi-directional connectivity to one or more external local area networks (LANS) and/or wide area networks (WANs), such as the internet.

The memory 16, which may be implemented using any suitable memory technology, may include a model of the optical system of interest 16A and a set of image data representing images 16B calculated using the model 16A (e.g., calculated images such as those shown in FIGS. 2, 4B, 5, 7B and 8). Note that the model 16A may be computed using the system 10 using suitable modeling software (which may then also be stored in the memory 10), or the model 16A may be computed elsewhere and subsequently sent to the system 10 (e.g., such as through the network interface 18) for storage in the memory 16. In another exemplary embodiment the model of the optical system 16A may be resident at another computer system, and only the calculated images 16B downloaded to the memory 10. As such, it should be appreciated that the particular embodiment shown in FIG. 10 is merely exemplary of the possible embodiments that the invention may assume.

The memory 16 may also include one or more image processing algorithms 16C, such as a focus algorithm 16D as discussed above, as well as any additional computer software that may be used to integrate the operation of the other software and data structures.

During operation the data processor 12 uses and executes the software programs and data structures as described above to objectively evaluate and improve image processing algorithms by applying the algorithms to calculated images with known properties.

Figure 11:
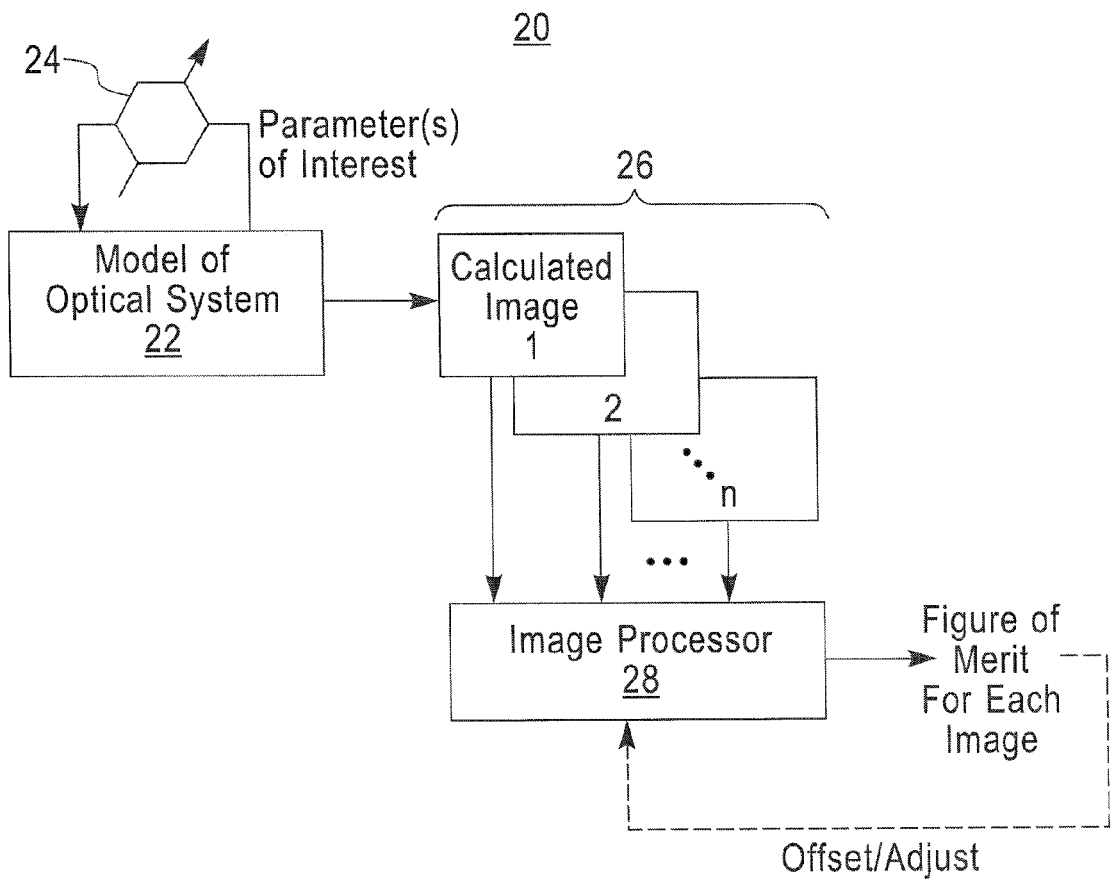
FIG. 11 is a block diagram of an apparatus that is suitable for implementing the exemplary embodiments of this invention.

For the purposes of describing and implementing the exemplary embodiments of this invention reference may also be made to FIG. 11, where there is shown a block diagram of an apparatus 20 that is suitable for implementing the exemplary embodiments of this invention. Note that the blocks shown may be implemented in hardware, as software, or as a combination of hardware and software. In FIG. 11 there is block that represents a mathematical model of the optical system 22. Note that as employed herein the "model of the optical system" may be a mathematical model or description of the optical system per se, such as a microscope. In addition, the "model of the optical system" may also include a mathematical model or description of a sample or samples of interest (e.g., a patterned photomask).

One or more model parameters of interest can be adjusted (represented by the device 24) to produce a set of calculated images 26 (e.g., calculated image 1, calculated image 2, ..., calculated image n), where each calculated image may represent one setting of n settings of the device 24 corresponding to one particular value of the parameter or parameters of interest. The parameter or parameters of interest of the model of the optical system that are varied by the device 24 may be at least one of focus, lens aberration, lens distortion, illumination uniformity, illumination noise, detector noise, numerical aperture, wavelength and blur, as non-limiting examples. The parameter or parameters of interest that may be varied by the device 24 may also be a sample property, such as at least one of sample feature type, sample feature size, sample optical properties including at least one of transmission and phase, reflectivity, transmission and phase shift, as non-limiting examples.

An image processor 28 embodies at least one type of image processing algorithm, such as a focus algorithm, and processes the set of calculated images 26 to produce a figure of merit (FOM) for each, which may then be used to determine how well the image processor 28 differentiates the calculated images 26 based on the varied parameter(s), and how successfully the image processor 28 selects the "best" image, e.g., the best focused image, from the set of images 26. One possible, but non-limiting use for the output of the image processor 28 is to improve the performance of a variance-based auto-focusing algorithm, such as one used in an inspection or similar type of tool. As was noted above for the exemplary case of the phase shift mask, it is possible to offset the focus of the imaging system by a predetermined offset amount based on the "best" focus position determined by the image processor. It is also possible to adjust an output of the algorithm based on a result of determining the ability of the image processor to detect the variation in the parameter. These latter operations are depicted in FIG. 11 by the dashed line representing a feedback path (e.g., offset/adjust) to the image processor 28.

The exemplary embodiments of this invention also pertain to a method, computer program product and an apparatus/system to evaluate image compression and decompression algorithms. Referring to the logic flow diagram of FIG. 12, at Block 12A there is a step/operation of injecting varying degrees of noise to a calculated image of a sample, producing a first set of calculated images having varying degrees of image degradation. At Block 12B there is a step/operation of applying at least one noise detecting algorithm to the first set of calculated images to evaluate the effectiveness of the at least one noise detecting algorithm to detect image degradation in the first set of calculated images. At Block 12C there is a step/operation of applying at least two different compression/decompression algorithms to the first set of calculated images to generate at least second and third sets of calculated images. At Block 12D there is a step/operation of applying the at least one noise detecting algorithm to the generated at least second and third sets of calculated images. At Block 12E there is a step/operation of determining which one of the at least two image compression/decompression algorithms introduces the least additional image degradation. As non-limiting examples, the image degradation may comprise at least one of blur, illumination non-uniformity, spatial distortion and lens aberration.

The exemplary embodiments of this invention also pertain to a hardware platform or system, which may be referred to as an apparatus, that includes at least one data processor coupled with at least one memory that stores computer program software. Where execution of the software by the at least one data processor results in the system evaluating an image processing algorithm by varying a parameter of a model of an imaging system and, for each variation of the parameter, calculating with the at least one data processor a corresponding image of a sample; applying an image processing algorithm to the calculated corresponding images of the sample; and determining an ability of the image processing algorithm to detect the variation in the parameter.

As should be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit", "module" or "system". Furthermore, aspects of the present invention may take the form of a computer program product embodied in one or more computer readable medium(s) having computer readable software program code embodied thereon.

Any combination of one or more computer readable medium(s) may be utilized. The computer readable medium may be a computer readable signal medium or a computer readable storage medium. A computer readable storage medium maybe, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

As such, various modifications and adaptations may become apparent to those skilled in the relevant arts in view of the foregoing description, when read in conjunction with the accompanying drawings and the appended claims. As but some examples, the use of other similar or equivalent optical system modeling techniques, other than those described in the various publications referred to above, may be used by those skilled in the art. However, all such and similar modifications of the teachings of this invention will still fall within the scope of this invention.

Furthermore, some of the features of the examples of this invention may be used to advantage without the corresponding use of other features. As such, the foregoing description should be considered as merely illustrative of the principles, teachings, examples and exemplary embodiments of this invention, and not in limitation thereof.

What is claimed is:

1. A method to evaluate an image processing algorithm, comprising:
    varying a parameter of a model of an imaging system and, for each variation of the parameter, calculating with a data processor a corresponding image of a sample;
    applying an image processing algorithm to the calculated corresponding images of the sample; and
    determining an ability of the image processing algorithm to detect the variation in the parameter.

2. The method of claim 1, where the imaging system operates in accordance with electromagnetic radiation, electrons, or ions to form an image.

3. The method of claim 1, where the varied parameter comprises at least one of focus, lens aberration, lens distortion, illumination uniformity, illumination noise, detector noise, numerical aperture, wavelength and blur.

4. The method of claim 1, where the varied parameter comprises a sample property.

5. The method of claim 4, where the sample property comprises at least one of sample feature type, sample feature size, sample optical properties including at least one of transmission and phase, reflectivity, transmission and phase shift.

6. The method of claim 1, where the imaging system comprises a photomask inspection tool, and where the image processing algorithm is used to detect photomask defects.

7. The method of claim 1, further comprising improving performance of a variance-based auto-focus algorithm by offsetting the focus by a predetermined amount based on a result of the step of determining the ability of the image processing algorithm to detect the variation in the parameter.

8. The method of claim 1, further comprising improving the performance of the image processing algorithm by adjusting an output of the algorithm based on a result of the step of determining the ability of the image processing algorithm to detect the variation in the parameter.

9. A method to evaluate image compression and decompression algorithms, comprising:
using a data processor, injecting varying degrees of noise to a calculated image of a sample, producing a first set of calculated images having varying degrees of image degradation;
applying at least one noise detecting algorithm to the first set of calculated images to evaluate the effectiveness of the at least one noise detecting algorithm to detect image degradation in the first set of calculated images;
applying at least two different compression/decompression algorithms to the first set of calculated images to generate at least second and third sets of calculated images;
applying the at least one noise detecting algorithm to the generated at least second and third sets of calculated images; and
determining which one of the at least two image compression/decompression algorithms introduces the least additional image degradation.

10. The method of claim 9, where the image degradation comprises at least one of blur, illumination non-uniformity, spatial distortion and lens aberration.

11. A computer-readable storage medium containing computer software instructions, the execution of the computer software instructions by a data processor resulting in operations that comprise:
varying a parameter of a model of an imaging system and, for each variation of the parameter, calculating a corresponding image of a sample;
applying an image processing algorithm to the calculated corresponding images of the sample; and
determining an ability of the image processing algorithm to detect the variation in the parameter.

12. The computer-readable storage medium of claim 11, where the imaging system operates in accordance with electromagnetic radiation, electrons, or ions to form an image.

13. The computer-readable storage medium of claim 11, where the varied parameter comprises at least one of focus, lens aberration, lens distortion, illumination uniformity, illumination noise, detector noise, numerical aperture, wavelength and blur.

14. The computer-readable storage medium of claim 11, where the varied parameter comprises a sample property.

15. The computer-readable storage medium of claim 14, where the sample property comprises at least one of sample feature type, sample feature size, sample optical properties including at least one of transmission and phase, reflectivity, transmission and phase shift.

16. The computer-readable storage medium of claim 11, where the imaging system comprises a photomask inspection tool, and where the image processing algorithm is used to detect photomask defects.

17. The computer-readable storage medium of claim 11, further comprising an operation of improving performance of a variance-based auto-focus algorithm by offsetting the focus by a predetermined amount based on a result of the step of determining the ability of the image processing algorithm to detect the variation in the parameter.

18. The computer-readable storage medium of claim 11, further comprising improving the performance of the image processing algorithm by adjusting an output of the algorithm based on a result of the step of determining the ability of the image processing algorithm to detect the variation in the parameter.

19. A computer-readable storage medium containing computer software instructions, the execution of the computer software instructions by a data processor resulting in operations that comprise:
injecting varying degrees of noise to a calculated image of a sample, producing a first set of calculated images having varying degrees of image degradation;
applying at least one noise detecting algorithm to the first set of calculated images to evaluate the effectiveness of the at least one noise detecting algorithm to detect image degradation in the first set of calculated images;
applying at least two different compression/decompression algorithms to the first set of calculated images to generate at least second and third sets of calculated images;
applying the at least one noise detecting algorithm to the generated at least second and third sets of calculated images; and
determining which one of the at least two image compression/decompression algorithms introduces the least additional image degradation.

20. The computer-readable storage medium of claim 19, where the image degradation comprises at least one of blur, illumination non-uniformity, spatial distortion and lens aberration.

* * * * *